United States Patent
Zhang et al.

(10) Patent No.: US 11,940,695 B2
(45) Date of Patent: Mar. 26, 2024

(54) MANUFACTURING METHOD OF LIGHT MODULATION PANEL, LIGHT MODULATION PANEL AND LIGHT MODULATION DEVICE

(71) Applicants: Beijing BOE Sensor Technology Co., Ltd., Beijing (CN); BOE Technology Group Co., Ltd., Beijing (CN)

(72) Inventors: Sikai Zhang, Beijing (CN); Chunlei Wang, Beijing (CN); Jing Yu, Beijing (CN)

(73) Assignees: Beijing BOE Sensor Technology Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 171 days.

(21) Appl. No.: 17/483,638

(22) Filed: Sep. 23, 2021

(65) Prior Publication Data

US 2022/0236599 A1 Jul. 28, 2022

(30) Foreign Application Priority Data

Jan. 25, 2021 (CN) .......................... 202110109530.X

(51) Int. Cl.
*G02F 1/1339* (2006.01)
*G02F 1/1341* (2006.01)

(52) U.S. Cl.
CPC ...... *G02F 1/13394* (2013.01); *G02F 1/13415* (2021.01); *G02F 2202/28* (2013.01)

(58) Field of Classification Search
None
See application file for complete search history.

(56) References Cited

U.S. PATENT DOCUMENTS

| | | | |
|---|---|---|---|
| 7,486,370 B2 * | 2/2009 | Choi | G02F 1/13394 |
| | | | 349/123 |
| 2018/0173076 A1 * | 6/2018 | Katagiri | C23C 14/0036 |
| 2021/0318563 A1 | 10/2021 | Wu et al. | |

FOREIGN PATENT DOCUMENTS

| CN | 203720502 U | 7/2014 |
|---|---|---|
| CN | 110171274 A | 8/2019 |
| CN | 211149139 U | 7/2020 |
| JP | 2002162632 A | 6/2002 |

* cited by examiner

*Primary Examiner* — Richard H Kim
(74) *Attorney, Agent, or Firm* — IPro, PLLC

(57) ABSTRACT

A manufacturing method of a light modulation panel, a light modulation panel and a light modulation device. The light modulation panel comprises: a first substrate and a second substrate arranged in align with each other, a liquid crystal filled between the first substrate and the second substrate, and spacer structures located between the first substrate and the second substrate and configured to maintain a cell gap of the liquid crystal; wherein the spacer structures comprise a first post spacer and a second post spacer arranged in a cascaded manner, the first post spacer is arranged on a side of the first substrate close to the second substrate, the second post spacer is arranged on a side of the second substrate close to the first substrate.

15 Claims, 5 Drawing Sheets

External area

MANUFACTURING METHOD OF LIGHT MODULATION PANEL, LIGHT MODULATION PANEL AND LIGHT MODULATION DEVICE

CROSS REFERENCE TO RELEVANT APPLICATION

The present application claims the priority of the Chinese patent application filed on Jan. 25, 2021 before the Chinese Patent Office with the application number of 202110109530.X and the title of "MANUFACTURING METHOD OF LIGHT MODULATION PANEL, LIGHT MODULATION PANEL AND LIGHT MODULATION DEVICE", which is incorporated herein in its entirety by reference.

TECHNICAL FIELD

The disclosure relates to the technical field of display, in particular to a manufacturing method of a light modulation panel, the light modulation panel, and a light modulation device.

BACKGROUND

At present, light modulation panels with liquid crystal dyes have been increasingly applied to construction and transport fields. The light modulation panel with liquid crystal dyes switches between a bright state and a dim state using a selective light absorption feature of dichroic dye molecules in a liquid crystal.

SUMMARY

The present disclosure provides a manufacturing method of a light modulation panel, the light modulation panel, and a light modulation device.

The present disclosure discloses a light modulation panel, which comprises: a first substrate and a second substrate arranged in an opposite manner a liquid crystal filled between the first substrate and the second substrate, and spacer structures between the first substrate and the second substrate and configured to maintain a cell gap of the liquid crystal;

wherein, the spacer structures include a first post spacer and a second post spacer arranged in a cascaded manner, the first post spacer is arranged on a side of the first substrate close to the second substrate, the second post spacer is arranged on a side of the second substrate close to the first substrate, a first surface of the first post spacer and a second surface of the second post spacer face and contact each other, and heights of the first post spacer and the second post spacer are identical in a direction of the first substrate toward the second substrate.

Optionally, the first surface and the second surface are rectangular, and a long-side direction of the first surface is crossed with a long-side direction of the second surface.

Optionally, the long-side direction of the first surface is perpendicular to the long-side direction of the second surface.

Optionally, the cell gap of the liquid crystal is greater than or equal to 10 µm.

Optionally, the spacer structures are uniformly distributed between the first substrate and the second substrate.

Optionally, a distance between the first surface and the first substrate is equal to a distance between the second surface and the second substrate.

Optionally, the first surface is arranged in parallel with the first substrate, and the second surface is arranged in parallel with the second substrate.

A light modulation device, comprising a first glass substrate, a bonding layer and the light modulation panel, wherein the bonding layer is configured to bond the first glass substrate and a first substrate or a second substrate of the light modulation panel.

Optionally, the light modulation panel comprises a light modulation area and a framed adhesive area located in a periphery of the light modulation area, the bonding layer comprises a first adhesive film layer, the first adhesive film layer is an annular adhesive tape, an orthographic projection of the annular adhesive tape on the light modulation panel is located in the framed adhesive area, the annular adhesive tape is formed with notches, and the notches are configured to communicate an internal area surrounded by the annular adhesive tape with an external area of the annular adhesive tape.

Optionally, the bonding layer comprises one or more adhesive film layers

Optionally, the bonding layer comprises at least one of the following: a Polyvinyl Butyral adhesive film layer or Polyethylene-polyvinyl acetate copolymer adhesive film layer, Optionally, the first surface and the second surface are rectangular, and a long-side direction of the first surface is crossed with a long-side direction of the second surface.

Optionally, the long-side direction of the first surface is perpendicular to the long-side direction of the second surface.

Optionally, the cell gap of the liquid crystal is greater than or equal to 10 µm Optionally, the annular adhesive tape is constituted by a plurality of adhesive tape segments, and the notches are seams between every two adjacent said adhesive tape segments.

Optionally, the annular adhesive tape is polygonally annular, and the notches are located in a center of each of sides of the annular adhesive tape.

Optionally, the bonding layer further comprises a second adhesive film layer arranged between the first glass substrate and the first adhesive film layer, and an orthographic projection of the second adhesive film layer on the light modulation panel covers the light modulation panel.

Optionally, a thickness of the first adhesive film layer and a thickness of the second adhesive film layer is greater than or equal to 0.3 mm and less than or equal to 1 mm.

The light modulation device further comprises: a second glass substrate arranged on a side of the light modulation panel away from the first glass substrate, and a support frame encapsulated at edges of the first glass substrate and the second glass substrate, wherein an inert gas is filled between the light modulation panel and the second glass substrate.

The present disclosure discloses a manufacturing method of a light modulation panel, comprising:
  providing a first substrate and a second substrate;
  forming a first post spacer on a side of the first substrate, and a second post spacer on a side of the second substrate;
  dropping a liquid crystal on a side of the first substrate close to the first post spacer, or dropping the liquid crystal on a side of the second substrate close to the second post spacer; and performing cell aligning with the first substrate and the second substrate to obtain a light modulation panel, wherein the first post spacer and the second post spacer are cascaded to form spacer structures, the spacer structures are arranged between the first substrate and the second substrate to maintain a cell gap of the liquid crystal, a first surface of the first post spacer and a second surface of the second post spacer face and contact each other, and heights of the first post spacer and the second post spacer are identical in a direction of the first substrate toward the second substrate.

BRIEF DESCRIPTION OF THE DRAWINGS

To better clarify the technical solution of the embodiment of the present disclosure, the attached drawings of the embodiment are simply described below. Obviously, the attached drawings described below merely illustrate some embodiments of the present disclosure. Those ordinarily skilled in the art can obtain other attached drawings without creative labor on the basis of those attached drawings.

DETAILED DESCRIPTION

To make the above objects, features and advantages of the present disclosure more apparent and easier to understand, the present disclosure are described in further detail below in conjunction with accompanying drawings and specific embodiments.

Figure 1:
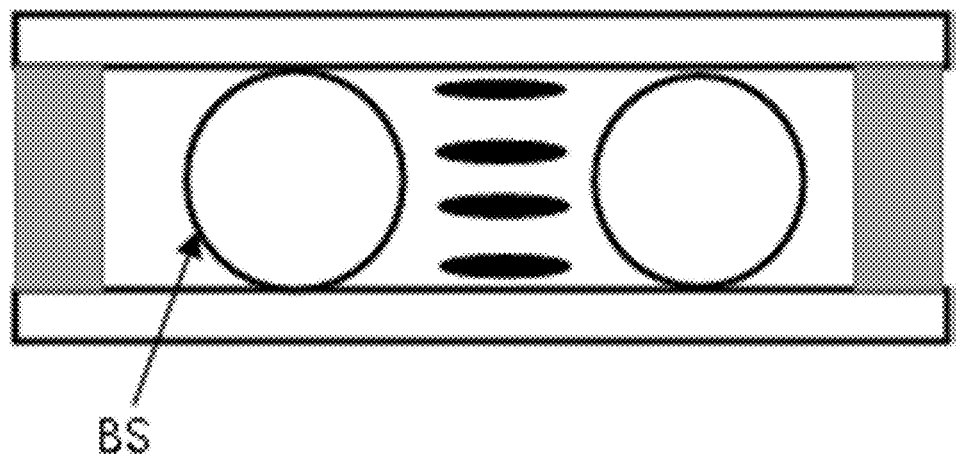
FIG. 1 illustrates a structural diagram of a liquid crystal dye cell using ball spacers in the relevant art.

In related art, there are two types of spacers which are post spacer (PS) and ball spacer (BS), are configured to support a cell gap of a light modulation panel with liquid crystal dyes. The preparation process of the BS is relatively simple. The BS may be directly sprayed on a substrate surface, and after being solidified at a high temperature, the BS is able to adhere to the substrate surface, as shown in FIG. 1. The BS has a particle size of 1 μm to 100 μm. Although the particle size of the BS may be regulated in a very wide range, it is impossible to uniformly spray the BS on an entire surface due to the features of its preparation process. During actual production, local absence or abnormal concentration of the BS usually occurs, resulting in white spots, black spots or other problems on the light modulation panel with liquid crystal dyes.

Figure 2:
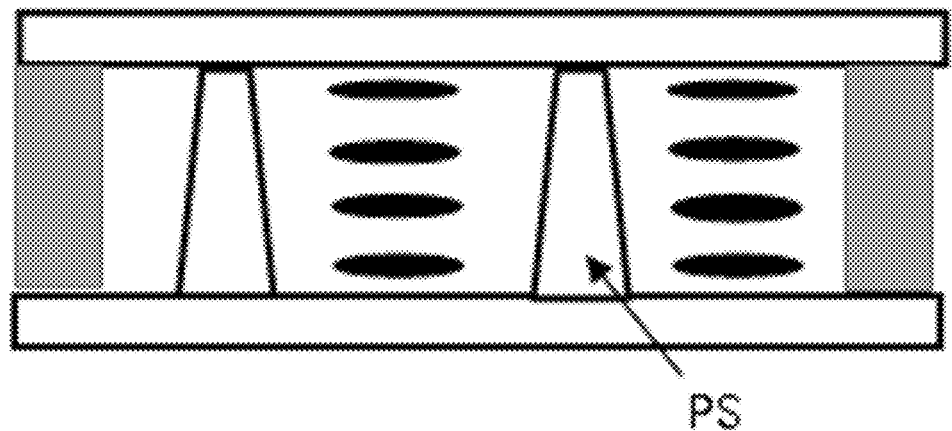
FIG. 2 illustrates a structural diagram of a liquid crystal dye cell using post spacer s in the relevant art.

Compared with the BS, the preparation process of the PS is relatively complicated. Procedures including photoresist coating, exposure, developing, etc., are performed in sequence to form patterned PS, as show in FIG. 2. The shape and position of the PS in the light modulation panel with liquid crystal dyes may be designed and controlled using a mask plate through exposure. At present, limited by materials, devices and processes, the maximum height of the PS may not exceed 10 μm, otherwise problems, such as fall-off the PS, may occur. Due to limitations to the maximum height of the PS, if a PS solution is adopted, current light modulation panels with liquid crystal dyes may only have a cell gap less than 10 μm, which greatly limits the transmissivity regulating range of the light modulation panel with liquid crystal dyes. Limited by the cell gap of the light modulation panel with liquid crystal dyes, liquid crystal dyes with a high concentration need to be added to fulfill the same transmissivity level, which increases costs of the liquid crystal on the one hand, and reduces the stability of the liquid crystal on the other hand. When the liquid crystal is stored at room temperature or at a low temperature, crystallization of dyes trends to occur. Therefore, how to use a PS solution to manufacture a light modulation panel with a large cell gap is a technical problem to be urgently solved in this field.

Figure 3:
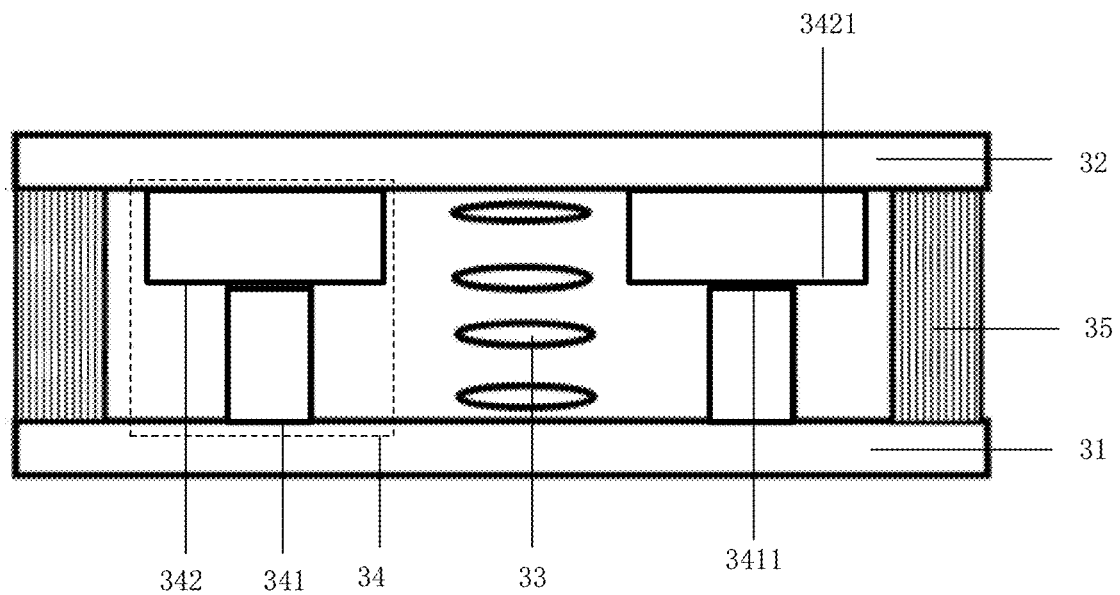
FIG. 3 illustrates a sectional structural diagram of a light modulation panel according to the embodiments of the application.

To solve the above-mentioned problems, the disclosure discloses a light modulation panel 53. As shown in FIG. 3, the light modulation panel 53 comprises a first substrate 31 and a second substrate 32 arranged in an opposite manner, a liquid crystal 33 filled between the first substrate 31 and the second substrate 32, and spacer structures 34 located between the first substrate 31 and the second substrate 32 and are configured to maintain a cell gap of the liquid crystal 33.

Wherein, the spacer structures 34 include a first post spacer 341 and a second post spacer 342 arranged in layer configuration, the first post spacer 341 is arranged on a side of the first substrate 31 close to the second substrate 32, the second post spacer 342 is arranged on a side of the second substrate 32 close to the first substrate 31, and a first surface 3411 of the first post spacer 341 and a second surface 3421 of the second post spacer 342 face and contact each other.

To further reduce difficulties in design and process, heights of the first post spacer 341 and the second post spacer 342 may be identical in a direction of the first substrate 31 toward the second substrate 32. That is, a distance between the first surface 3411 and the first substrate 31 may be equal to a distance between the second surface 3421 and the second substrate 32.

In actual application, the first post spacer 341 and the second post spacer 342 may be made of materials, such as photoresist, etc., and the specific materials are not limited in this embodiment.

According to this embodiment, the first surface 3411 is a surface of the first post spacer 341 away from the first substrate 31, and the first surface 3411 may be arranged in parallel with the first substrate 31. The second surface 3421 is a surface of the second post spacer 342 away from the second substrate 32, and the second surface 3421 may be arranged in parallel with the second substrate 32.

According to this embodiment, the cell gap of the liquid crystal 33 is equal to the sum of heights of the first post spacer 341 and the second post spacer 342. The height of the first post spacer 341 refers to a size of the first post spacer 341 in the direction of the first substrate 31 toward the second substrate 32 (or a direction perpendicular to the first substrate 31 or the second substrate 32). The height of the second post spacer 342 refers to a size of the second post spacer 342 in the direction of the first substrate 31 toward the second substrate 32.

For the light modulation panel according to this embodiment, the first post spacer 341 is manufactured on the first substrate 31, and the second post spacer 342 is manufactured on the second substrate 32. As the first substrate 31 and the second substrate 32 arranged in layer configuration are respectively formed with the post spacer s, and the first post spacer 341 and the second post spacer 342 are arranged in layer configuration to form the spacer structures 34 which support the cell gap of the liquid crystal 33, a light modulation panel 53 with a large cell gap may be formed.

Using the spacer structures 34 according to this embodiment, the cell gap of the liquid crystal 33 may be greater than or equal to 10 μm. Of course, such spacer structures may also be configured to manufacture products of which the liquid crystal has a cell gap of less than 10 μm. The cell gap of the liquid crystal 33 is not limited in this embodiment. Wherein, the cell gap of the liquid crystal 33 is the cell gap of the light modulation panel 53.

To ensure the uniformity of the cell gap of the liquid crystal 33, the spacer structures 34 may be uniformly distributed between the first substrate 31 and the second substrate 32. For example, the spacer structures 34 may be periodically arrayed in a light modulation area 71 of the entire light modulation panel 53 at a certain interval.

In actual application, the first surface 3411 and the second surface 3421 may be square, rectangular, round, elliptical, etc. The specific shapes of the first surface 3411 and the second surface 3421 are not limited in this embodiment.

In practical application, fluctuations in device precision may result in position shift of the first post spacer 341 and/or the second post spacer 342 during manufacturing. When the shapes of the first surface 3411 and the second surface 3421 are strip-like, for example, rectangular, round, etc., and long-side directions of the first surface 3411 and the second surface 3421 are crossed, regardless of the position shift in the long-side direction or in a short-side direction, it may be ensured that the first post spacer 341 and the second post spacer 342 may contact each other, such that the spacer structures 34 formed by the first post spacer 341 and the second post spacer 342 may stably support the cell gap of the liquid crystal 33, thereby improving the stability of the cell gap of the liquid crystal. When the shapes of the first surface 3411 and the second surface 3421 are round or square, if positions of the first surface 3411 and the second surface 3421 shift, the first surface 3411 and the second surface 3421 will not contact each other or contact each other in a very small area, thus causing an inclination to the spacer structures 34 formed by the post spacer 341 and the second post spacer 342, and affecting the cell gap of the liquid crystal 33.

Figure 4:
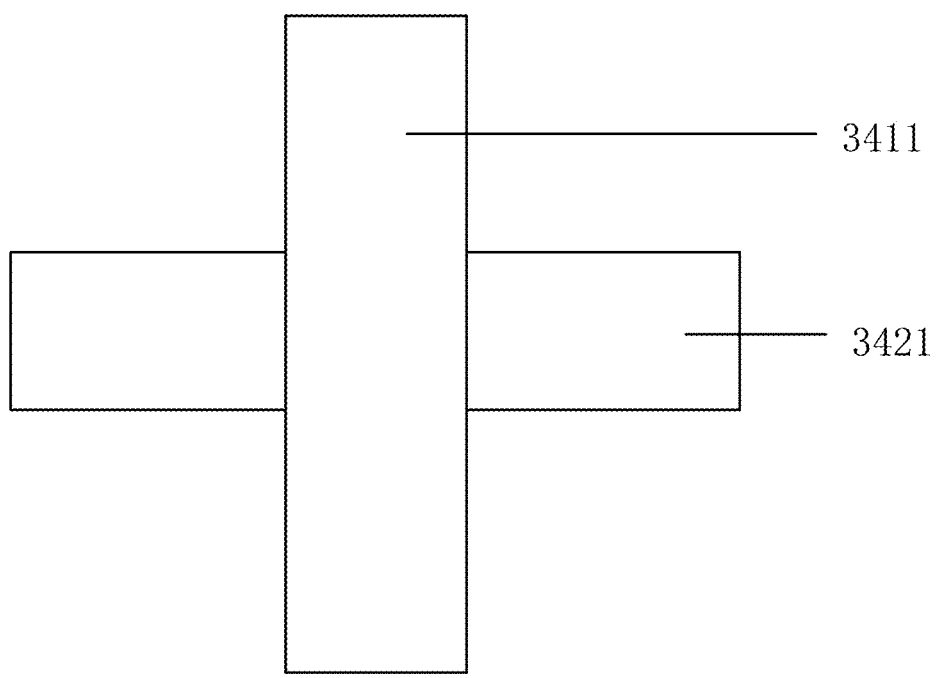
FIG. 4 illustrates a planar structural diagram of a first surface and a second surface according to the embodiments of the application.

According to an optional implementation, referring to FIG. 4, the first surface 3411 and the second surface 3421 may be rectangular, and the long-side direction of the first surface 3411 and the long-side direction of the second surface 3421 may be crossed.

According to this implementation, when the position of the post spacer 341 and/or the position of the second post spacer 342 shifts during manufacturing, it is ensured not only that the first surface 3411 and the second surface 3421 contact each other, but also that the contact area between the two remains unchanged, further improving the stability of the cell gap of the liquid crystal 33.

To further improve the stability of the cell gap of the liquid crystal, the long-side directions of the rectangular first surface 3411 and the rectangular second surface 3421 may be perpendicular to each other, as shown in FIG. 4.

During specific implementation, sizes of long sides of the rectangular first surface 3411 and the rectangular second surface 3421 may be determined according to position precision of the first post spacer 341 and the second post spacer 342 during manufacturing and alignment precision during alignment. Sizes of short sides may be determined according to actual demand, for example the contact area. The specific sizes of the first surface 3411 and the second surface 3421 are not limited in this embodiment.

The first surface 3411 and the second surface 3421 are set to be rectangular and the long-side directions are set to be crossed, so a light modulation panel with a large cell gap and with high stability may be formed, requirements for process precision may be lowered, two post spacer s are still able to contact stably under the condition of fluctuations in process, and a firmer light modulation panel structure may be formed.

Figure 5:
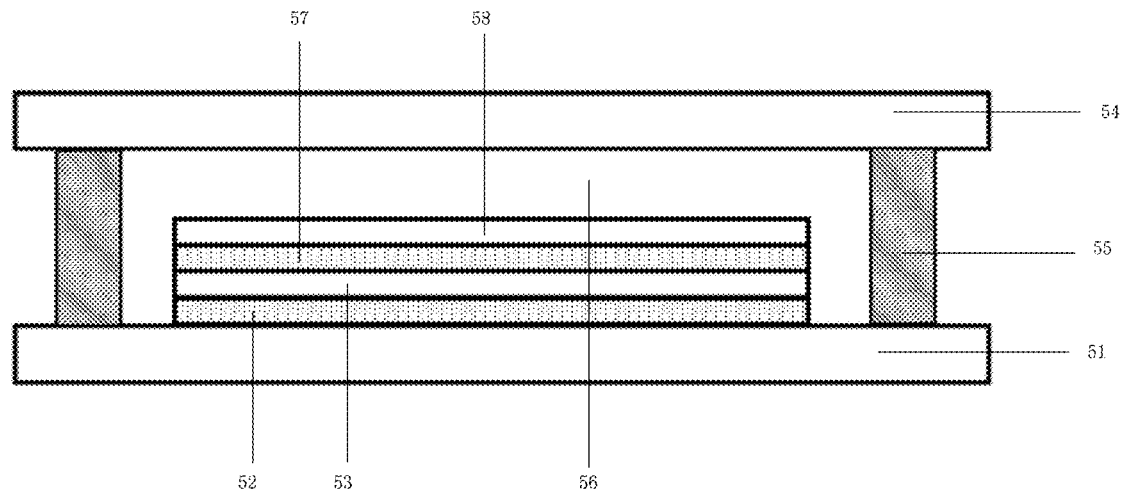
FIG. 5 illustrates a sectional structural diagram of a light modulation device according to the embodiments of the application.
Figure 6:
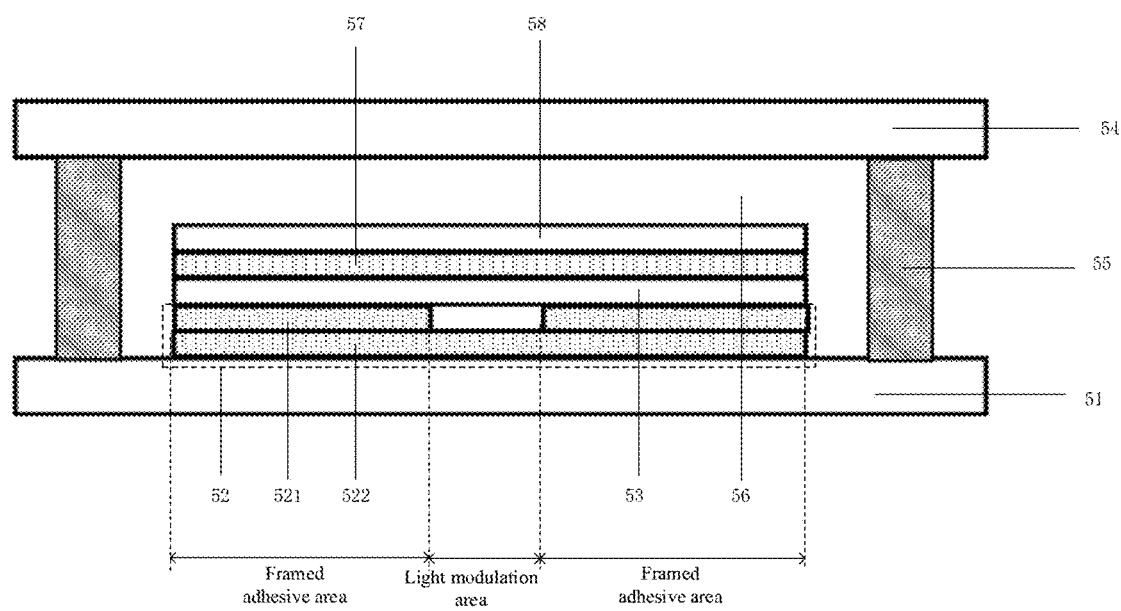
FIG. 6 illustrates a sectional diagram of another light modulation device according to the embodiments of the application.

Another embodiment of the application further provides a light modulation device. Referring to FIG. 5 and FIG. 6, the light modulation device may comprise a first glass substrate 51, a bonding layer 52 and the light modulation panel 53 according to any one of the embodiments, wherein the bonding layer 52 is configured to bond the first glass substrate 51 and a first substrate or a second substrate of the light modulation panel 53.

Wherein, the bonding layer 52 may comprise an adhesive film layer, for example a Polyvinyl Butyral (PVB) or Polyethylene-polyvinyl acetate copolymer (EVA) adhesive film layer, which is not limited in this embodiment of the present disclosure.

The bonding layer 52 may comprise one or more adhesive film layers, which is not limited in this embodiment of the present disclosure.

The first glass substrate 51 may be a rigid glass substrate, or a flexible glass substrate, which is not limited in this embodiment of the present disclosure.

Applicable scenarios of the light modulation device according to this embodiment may be smart window products of buildings, for example, doors, windows, curtain walls and show windows, which is not limited in this embodiment.

During specific implementation, the light modulation device may further comprise a second glass substrate 54 arranged on a side of the light modulation panel 53 away from the first glass substrate 51.

Wherein, the second glass substrate 54 may be a rigid glass substrate, or a flexible glass substrate, which is not limited in this embodiment of the present disclosure.

Since the smart window products need to meet requirements of applicable scenarios for protection against wind, sunlight and rain, the light modulation device may further comprise, in addition to the light modulation panel 53 for modulating light, the first glass substrate 51 and the second glass substrate 54 which are assembled with the light modulation panel 53, thereby forming a stable light modulation device structure and improving the durability of products.

In practical application, the second glass substrate 54 and the light modulation panel 53 may contact each other to form a fitted light modulation device. A clearance may further be formed between the second glass substrate 54 and the light modulation panel 53 to form a hollowed light modulation device. Such hollowed structure design may have sound and heat insulation functions.

According to an optional implementation, as shown in FIG. 5 and FIG. 6, the hollowed light modulation device may further comprise a support frame 55 encapsulated at edges of the first glass substrate 51 and the second glass substrate 54, wherein an inert gas is filled between the light modulation panel 53 and the second glass substrate 54.

Wherein, the support frame 55 may be an aluminum frame, etc., which is not limited in this embodiment of the present disclosure.

The first glass substrate 51 and the second glass substrate 54 may be hard glass such as tampered glass.

According to this embodiment, the first glass substrate 51 and the second glass substrate 54 are connected through a ring of peripheral support frame 55 to form a closed space 56 with a certain height, and the closed space 56 is fully filled with inert gases.

In practical application, a flatness control standard for the first glass substrate 51 is relatively low, for example, the flatness control standard for the first glass substrate 51 may be 0.3%, that is, the surface height difference of the first glass substrate 51 may reach 3 mm within a 1 m length range of the first glass substrate 51. The inventor found that, when the bonding layer 52 comprises a layer of adhesive film that is adhered to the entire surface of the light modulation panel 53, as shown in FIG. 5, the adhesive film is melt down and flows at a high temperature and a high pressure, and fills in uneven areas on the surface of the first glass substrate 51. And meanwhile, the high pressure forces the light modulation panel 53 to contact the adhesive film, so the light modulation panel 53 has tiny deformations in the uneven areas of the first glass substrate 51. After the adhesive film cools down and is solidified, the adhesive film will transfer the unevenness of the first glass substrate 51 to the light modulation panel 53, resulting in a non-uniform cell gap due to tiny deformations in corresponding areas of the light modulation panel 53. A black spot defect may be induced when the cell gap in the deformed area increases.

Figure 7:
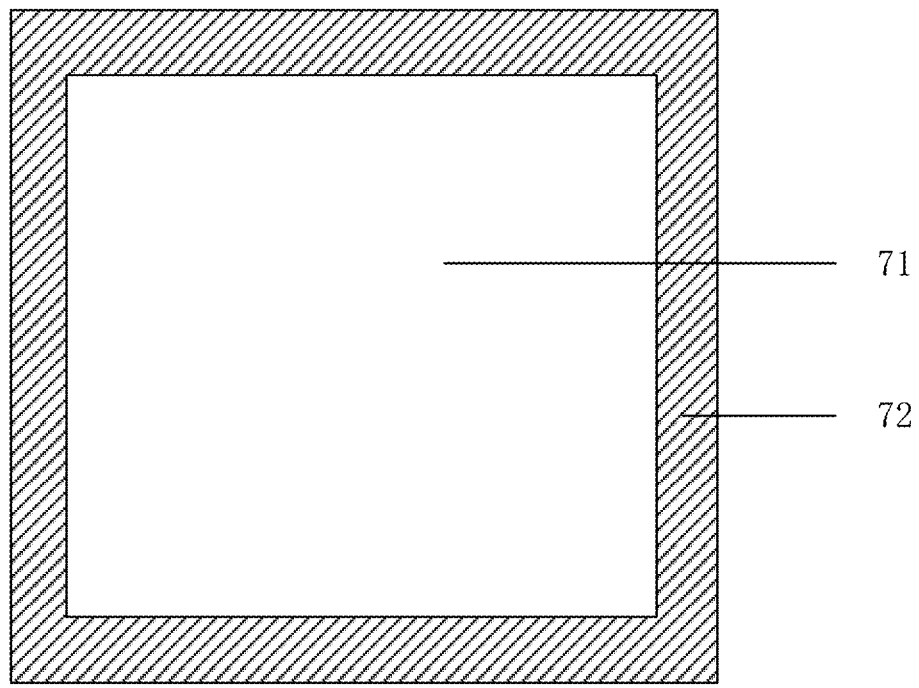
FIG. 7 illustrates a planar structural diagram of a light modulation panel according to the embodiments of the application.
Figure 8:
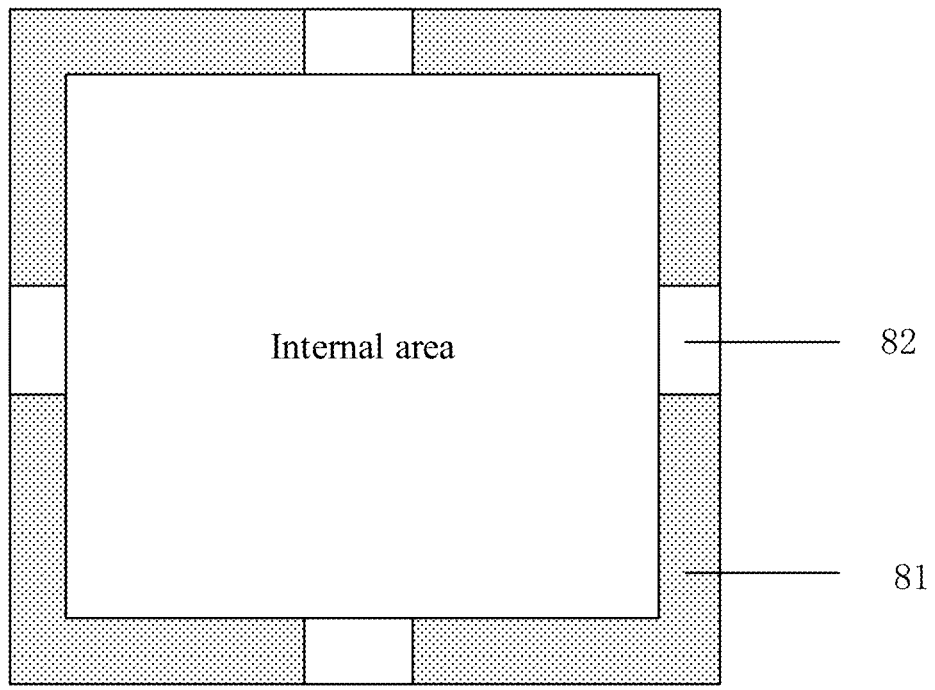
FIG. 8 illustrates a planar structural diagram of a first adhesive film layer according to the embodiments of the application.
Figure 9:
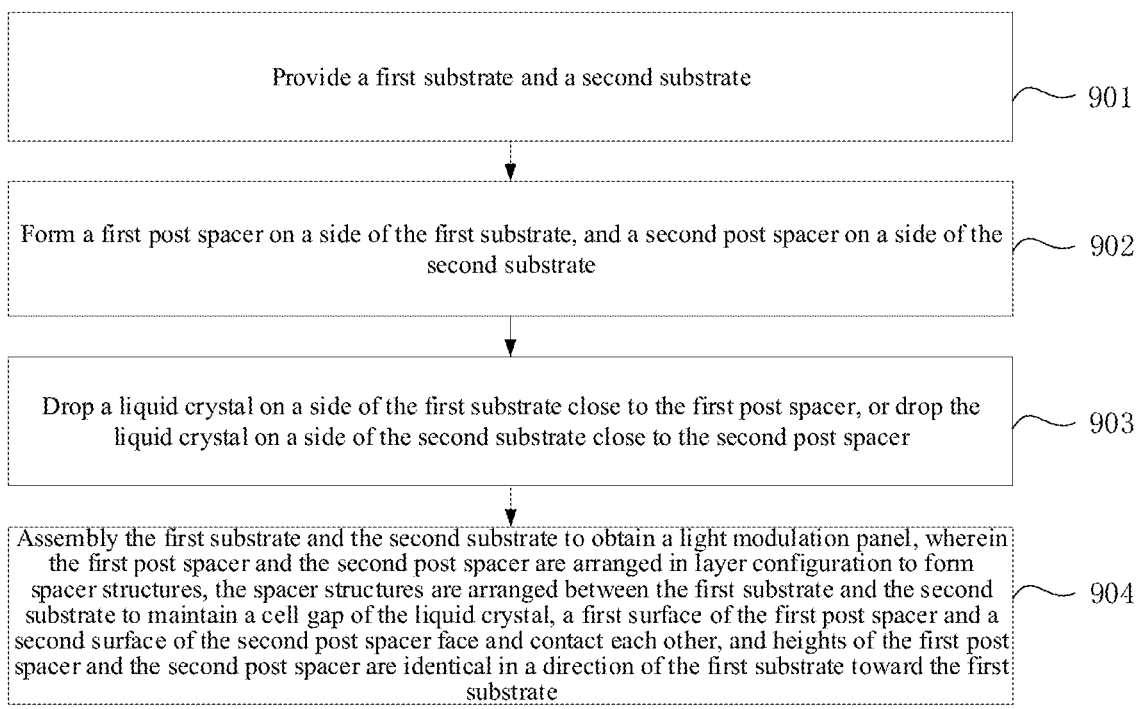
FIG. 9 illustrates a flowchart of a manufacturing method of a light modulation panel according to the embodiments of the application.

As shown in FIG. 6 and FIG. 7, the light modulation panel 53 may comprise a light modulation area 71 and a framed adhesive area 72 in the periphery of the light modulation area 71. To avoid the black spot defect, according to an optional implementation, as shown in FIG. 6, the bonding layer 52 may comprise a first adhesive film layer 521. The first adhesive film layer 521 is an annular adhesive tape 81, and an orthographic projection of the annular adhesive tape 81 on the light modulation panel 53 is located in the framed adhesive area, as shown in FIG. 8.

Specifically, the orthographic projection of the annular adhesive tape 81 on the light modulation panel 53 may be completely superimposed with the framed adhesive area 72.

During specific implementation, the first adhesive layer film 521 is arranged in the framed adhesive area 72 of the light modulation panel 53, such that the influence of the unevenness of the first glass substrate 51 on the light modulation area 71 may be minimized. Since the first adhesive film layer 521 has a certain thickness, for example the thickness may be 0.3-1 mm, the light modulation area 71 of the light modulation panel 53 and the first glass substrate 51 are separated by a certain space interval and do not directly contact each other after the light modulation layer 53 is bonded with the first adhesive film layer 521. Such design may effectively overcome the black spot defect resulting from the surface unevenness of the first glass substrate 51.

According to this embodiment, the first adhesive film layer 521 directly contacts the first substrate or the second substrate of the light modulation panel 53. The first adhesive film layer 521 is arranged in the framed adhesive area 72 of the light modulation panel 53 and the light modulation area 71 of the light modulation panel 53 is not adhered by the adhesive film, Doing so may avoid transfer of the unevenness of the first glass substrate 51 to the light modulation panel 53 via the adhesive film, avoid a non-uniform cell gap resulting from local deformations of the light modulation panel 53, and further avoid the black spot defect induced by an increase in the cell gap. At the same time, doing so may further properly lower the flatness control standard for the first glass substrate 51.

During specific implementation, as shown in FIG. 8, the annular adhesive tape 81 is provided with notches 82, and the notches 82 are configured to communicate an internal area surrounded by the annular adhesive tape 81 and an external area of the annular adhesive tape 81.

In practical application, the process in which the light modulation panel 53 and the first glass substrate 51 are assembled is executed under conditions of a high temperature and a high pressure. On the one hand, the adhesive film of the bonding layer 82 melts down at the high temperature, and on the other hand, the high pressure forces the light modulation panel 53 and the first glass substrate 51 to be fitted as much as possible to realize bonding. Wherein, the high pressure may be 10-12 atmospheric pressure. Under such a high-pressure condition, providing that the annular adhesive tape 81 is of a closed annular design, the pressure on a middle space interval (internal area) formed between the closed annular adhesive tape 81 and the light modulation panel 53 is about 1 atmospheric pressure, and in a high-pressure environment, the light modulation area 71 of the light modulation pane 53 may bend and deform, and in serious cases, may be damaged, due to the high pressure.

According to this embodiment, the annular adhesive tape 81 is provided with notches 82 with a certain width, such that gas flows between the internal area surrounded by the annular adhesive tape 81 and the external area of the annular adhesive tape 81, thereby ensuring that the pressure of the internal area and the pressure of the external area keep consistent, and preventing the light modulation panel 53 from bending and deforming.

The shape of the annular adhesive tape 81 may be identical with the shape of the framed adhesive area, for example, the annular adhesive tape 81 may be polygonally annular. The annular adhesive tape 81 shown in FIG. 8 is quadrilaterally annular. The shape of the annular adhesive tape 81 is not limited in this embodiment.

When the annular adhesive tape 81 may be polygonally annular, the notches 82 may be respectively located in the center of each of sides of the annular adhesive tape 81. The specific position, shape, size and quantity of the notches 82 are not limited in the embodiments of the present disclosure. The notches may be located at any position on the annular adhesive tape 81.

Specifically, the annular adhesive tape 81 may be constituted by a plurality of adhesive tape segments, and the notches 82 are seams between every two adjacent adhesive tape segments. FIG. 8 illustrates an L-shaped adhesive tape segment. The shape of the adhesive tape segment is not limited in this embodiment.

When the notches 82 may be respectively located at the center of each of the sides of the annular adhesive tape 81, the shape and specification of the adhesive tape segments are uniform, which may simplify design and process.

According to this embodiment, the first adhesive film layer 521 is adhered to the framed adhesive area 72 of the light modulation panel 53 to bond the light modulation panel 53 and the first glass substrate 51. Doing so may effectively avoid the black spot defect of the light modulation panel resulting from the unevenness of the first glass substrate 51. Moreover, as the annular adhesive tape 81 is formed with the notches 82, it is ensured that the light modulation panel 53 does not bend and deform in the high-pressure environment.

During specific implementation, as shown in FIG. 6, the bonding layer 52 may further comprise a second adhesive film layer 522 arranged between the first glass substrate 51 and the first adhesive film layer 521, and an orthographic projection of the second adhesive film layer 522 on the light modulation panel 53 covers the light modulation panel 53.

According to this embodiment, the first glass substrate 51 may be fitted with the second adhesive film layer 522 first. The second adhesive film layer 522 not only has a function against ultraviolet rays, but also protects smashing toughed glass from injuring people, and improves the safety of the light modulation device. Then, on the basis of the entire second adhesive film layer 522, a precut annular adhesive tape 81 may be pasted in the framed adhesive area along the edge of the light modulation panel 53. The annular adhesive tape 81 is not a closed ring, and the annular adhesive tape 81 is formed with the notches 82 with a certain width, as shown in FIG. 8. Along the normal direction of the annular adhesive tape 81 (namely perpendicular to the annular direction of the annular adhesive tape 81), sizes of the annular adhesive tape 81 and the framed adhesive area may be identical. The annular adhesive tape 81 is formed with the notches 82 with a certain width, such that gas flows between the internal area surrounded by the annular adhesive tape 81 and the external area of the annular adhesive tape 81, thereby ensuring that the pressure of the internal area and the pressure of the external area keep consistent; and the pressure on the middle space interval (internal area) forces the second adhesive film layer 522 and the first glass substrate 51 to be fitted and bonded better.

According to this embodiment, a thickness of the first adhesive film layer 521 and/or a thickness of the second adhesive film layer 522 may be greater than or equal to 0.3 mm and less than or equal to 1 mm.

As shown in FIG. 5 and FIG. 6, the light modulation device may further comprise another light modulation panel 58 arranged on a side of the light modulation panel 53 away from the first glass substrate 51, and the light modulation panel 53 and the another light modulation panel 58 may be bonded by an adhesive film layer arranged on an entire surface. Wherein, the another light modulation panel 58 may be the light modulation panel according to any one of the above-mentioned embodiments. Structures of the light modulation panel 53 and the another light modulation panel 58 may be identical or different.

Another embodiment of the application further provides a manufacturing method of a light modulation panel, comprising:

Step 901: providing a first substrate and a second substrate.

Step 902: forming a first post spacer on a side of the first substrate, and a second post spacer on a side of the second substrate.

Step 903: dropping a liquid crystal on a side of the first substrate close to the first post spacer, or dropping the liquid crystal on a side of the second substrate close to the second post spacer.

Step 904: assembling the first substrate and the second substrate to obtain a light modulation panel, wherein the first post spacer and the second post spacer are cascaded to form spacer structures, the spacer structures are arranged between the first substrate and the second substrate to maintain a cell gap of the liquid crystal, a first surface of the first post spacer and a second surface of the second post spacer face and contact each other, and heights of the first post spacer and the second post spacer are identical in a direction of the first substrate toward the second substrate.

The light modulation panel according to any one of the above-mentioned embodiments may be manufactured using the manufacturing method according to this embodiment, and the specific structure and functions of the light modulation panel may be seen in the description of the aforementioned embodiments, and are not repeated here.

The technical solution of the application provides a manufacturing method of a light modulation panel, the light modulation panel and a light modulation device. The light modulation panel comprises: the first substrate and the second substrate arranged in an opposite manner, the liquid crystal filled between the first substrate and the second substrate, and the spacer structures located between the first substrate and the second substrate, wherein the spacer structures are configured to maintain the cell gap of the liquid crystal; wherein the spacer structures include the first post spacer and the second post spacer arranged in a cascaded manner, the first post spacer is arranged on the side of the first substrate close to the second substrate, the second post spacer arranged on the side of the second substrate close to the first substrate, the first surface of the first post spacer and the second surface of the second post spacer face and contact each other, and the heights of the first post spacer and the second post spacer are identical in the direction of the first substrate toward the second substrate. According to the technical solution of the application, the first post spacer is manufactured on the first substrate, and the second post spacer is manufactured on the second substrate. As the first substrate and the second substrate arranged in an opposite manner are respectively formed with the post spacer s, and the first post spacer and the second post spacer are cascaded, the light modulation panel with a large cell gap may be formed.

All embodiments in this specification are described progressively. Each of the embodiments has highlights different from others. Identical or similar contents in the embodiments may be made as reference.

Finally, it should be noted that, relational terms herein such as "first" and "second" are merely configured to distinguish one object or operation from another object or operation, and not necessarily require or hint that those objects or operations have any such actual relationship or are in such actual sequence. Moreover, terms "including", "comprising", or any other variants are configured to cover non-exclusive inclusion, so that processes, methods, articles or user equipment, each of which includes a series of factors, include not only those factors but also other unlisted factors, or further include other inherent factors of such processes, methods, articles or user equipment. Without more constraints, an element preceded by "includes a . . . " does not preclude the existence of additional identical elements in the process, method, product, or device that includes the element.

The manufacturing method of a light modulation panel, the light modulation panel and the light modulation device of the present disclosure are described in detail above. Specific examples are used herein to explain the principle and implementation of the present disclosure. The above embodiments are described for the only purpose of assisting in understanding of the method and core concept of the present disclosure. Meanwhile, a person of ordinary skill in the art may make variants to the specific implementation and application scope based on the concept of the present disclosure. In conclusion, the content of this specification should not be construed as limiting the present disclosure.

The invention claimed is:

1. A light modulation device, comprising a first glass substrate, a bonding layer and a light modulation panel, wherein the light modulation panel comprises:
a first substrate and a second substrate arranged in align with each other;
a liquid crystal filled between the first substrate and the second substrate; and
spacer structures located between the first substrate and the second substrate and the spacer structures are configured to maintain a cell gap of the liquid crystal;
wherein the spacer structure comprises a first post spacer and a second post spacer arranged in layer configuration, the first post spacer is arranged on a side of the first substrate close to the second substrate, the second post spacer is arranged on a side of the second substrate close to the first substrate, a first surface of the first post spacer and a second surface of the second post spacer face and contact each other;
the bonding layer is configured to bond the first glass substrate and a first substrate or a second substrate of the light modulation panel; and
the light modulation panel further comprises a light modulation area and a framed adhesive area located in a periphery of the light modulation area, the bonding layer comprises a first adhesive film layer, the first adhesive film layer is an annular adhesive tape, an orthographic projection of the annular adhesive tape on the light modulation panel is located in the framed adhesive area, the annular adhesive tape is formed with notches, and the notches are configured to communicate an internal area surrounded by the annular adhesive tape with an external area of the annular adhesive tape.

2. The light modulation device according to claim 1, wherein the bonding layer comprises one or more adhesive film layers.

3. The light modulation device according to claim 1, wherein the bonding layer comprises at least one of the following: a Polyvinyl Butyral adhesive film layer or Polyethylene-polyvinyl acetate copolymer adhesive film layer.

4. The light modulation device according to claim 1, wherein the first surface and the second surface are rectangular, and a long-side direction of the first surface is crossed with a long-side direction of the second surface.

5. The light modulation device according to claim 4, wherein the long-side direction of the first surface is perpendicular to the long-side direction of the second surface.

6. The light modulation device according to claim 4, wherein the cell gap of the liquid crystal is greater than or equal to 10 μm.

7. The light modulation device according to claim 1, wherein the annular adhesive tape is constituted by a plurality of adhesive tape segments, and the notches are seams between every two adjacent said adhesive tape segments.

8. The light modulation device according to claim 1, wherein the annular adhesive tape is polygonally annular, and the notches are located in a center of each of sides of the annular adhesive tape.

9. The light modulation device according to claim 1, wherein the bonding layer further comprises a second adhesive film layer arranged between the first glass substrate and the first adhesive film layer, and an orthographic projection of the second adhesive film layer on the light modulation panel covers the light modulation panel.

10. The light modulation device according to claim 1, a thickness of the first adhesive film layer and a thickness of the second adhesive film layer is greater than or equal to 0.3 mm and less than or equal to 1 mm.

11. The light modulation device according to claim 1, further comprising: a second glass substrate arranged on a side of the light modulation panel away from the first glass substrate, and a support frame encapsulated at edges of the first glass substrate and the second glass substrate, wherein an inert gas is filled between the light modulation panel and the second glass substrate.

12. The light modulation device according to claim 1, wherein the spacer structures are uniformly distributed between the first substrate and the second substrate.

13. The light modulation device according to claim 1, wherein a distance between the first surface and the first substrate is equal to a distance between the second surface and the second substrate.

14. The light modulation device according to claim 1, wherein the first surface is arranged in parallel with the first substrate, and the second surface is arranged in parallel with the second substrate.

15. The light modulation device according to claim 1, wherein heights of the first post spacer and the second post spacer are identical in a direction of the first substrate toward the second substrate.

* * * * *